United States Patent
LoGalbo et al.

(10) Patent No.: US 8,687,613 B2
(45) Date of Patent: Apr. 1, 2014

(54) METHOD AND SYSTEM FOR PEER TO PEER WIDE AREA NETWORK COMMUNICATION

(75) Inventors: Robert D. LoGalbo, Rolling Meadows, IL (US); Bradley M. Hiben, Glen Ellyn, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 421 days.

(21) Appl. No.: 12/870,007

(22) Filed: Aug. 27, 2010

(65) Prior Publication Data

US 2010/0322137 A1 Dec. 23, 2010

Related U.S. Application Data

(62) Division of application No. 11/948,121, filed on Nov. 30, 2007, now Pat. No. 7,813,327.

(51) Int. Cl.
*H04W 4/00* (2009.01)

(52) U.S. Cl.
USPC .......................................... 370/338; 370/411

(58) Field of Classification Search
None
See application file for complete search history.

(56) References Cited

U.S. PATENT DOCUMENTS

| | | | | |
|---|---|---|---|---|
| 5,963,547 | A * | 10/1999 | O'Neil et al. .................. | 370/260 |
| 6,216,173 | B1 * | 4/2001 | Jones et al. .................... | 715/705 |
| 6,404,745 | B1 * | 6/2002 | O'Neil et al. .................. | 370/260 |
| 6,928,294 | B2 | 8/2005 | Maggenti et al. | |
| 7,353,252 | B1 * | 4/2008 | Yang et al. ..................... | 709/204 |
| 7,813,327 | B2 * | 10/2010 | LoGalbo et al. .............. | 370/338 |
| 2002/0119795 | A1 | 8/2002 | Dorenbosch | |
| 2003/0002476 | A1 * | 1/2003 | Chung et al. .................. | 370/352 |
| 2006/0075127 | A1 * | 4/2006 | Juncker et al. ................ | 709/229 |
| 2006/0215684 | A1 * | 9/2006 | Capone ......................... | 370/437 |
| 2007/0049314 | A1 | 3/2007 | Balachandran et al. | |
| 2007/0143478 | A1 | 6/2007 | Logalbo et al. | |
| 2009/0144441 | A1 * | 6/2009 | LoGalbo et al. .............. | 709/235 |
| 2010/0191994 | A1 * | 7/2010 | Nurminen et al. ............ | 713/323 |
| 2010/0217794 | A1 * | 8/2010 | Strandell et al. .............. | 709/203 |
| 2013/0039364 | A1 * | 2/2013 | Pankratov ..................... | 370/389 |
| 2013/0067101 | A1 * | 3/2013 | Xu et al. ....................... | 709/228 |

OTHER PUBLICATIONS

Rosenberg, J. et al., "STUN—Simple Traversal of User Datagram Protocol (UDP) Through Network Address Translators (NATs)," Network Working Group, Request for Comments: 3489, 2003, pp. 1-47.*

Srisuresh, P. et al., "IP Network Address Translator (NAT) Terminology and Considerations," Network Working Group, Request for Comments: 2663, 1999, pp. 1-30.*

(Continued)

*Primary Examiner* — Donald Mills
(74) *Attorney, Agent, or Firm* — Randi L. Karpinia; Daniel R. Bestor

(57) ABSTRACT

A method and system for peer to peer wide area network communication is provided. A peer in the network receives one or more media and one or more associated control signaling from any one of a plurality of Logical Media/Control Channels, wherein each Logical Media/Control Channel is associated with a Transport Resource on a base station; formats the media into a Formatted Media Packet; formats the control signaling into an Internet Peer to Peer Control Signaling; concatenates the Formatted Media with the Internet-Peer to Peer Control Signaling to form a Concatenated Packet comprising an Internet-Peer to Peer Control Signaling and a Media Packet; duplicates the Concatenated Packet, thereby forming a duplicated Concatenated Packet comprising at least one of a unicast packet and a multicast packet; and transmits the duplicated Concatenated Packets via the wide area network.

11 Claims, 9 Drawing Sheets

(56) References Cited

OTHER PUBLICATIONS

USPTO, Parent U.S. Appl. No. 11/948,121, Office Action, Restriction, Nov. 16, 2009, 8 pages.
PCT/US2008/083948, PCT Search Report and Written Opinion, mailed Jan. 21, 2010, 21 pages.
Motorola, Motobridge IP System Overview, Commonweath of Virginia, Section 2A, Mar. 1, 2007, XP002618221, 10 pages.
Bank, S.M. et al., Distributed Floor Control Protocols for Computer Collaborative Applications on Overlay Networks, 2005 International Conference on Collaborative Computing: Networking, Applications, and Worksharing, Dec. 19-21, 2005, IEEE, 10 pages.
ETSI TR 102024-7 V4.1.1, Telecommunications and Internet Protocol Harmonization Over Networks (TIPHON) Release 4; End-to-end Quality of Seivice in TIPHON Systems; Part 7: Design Guide for Elements of a TIPHON Connection from an End-to-end Speech Transmission Performance Point of View, ETSI Standards, Sophia Antipolis Cedex, France, Sep. 2003, 72 pages.
International Telecommunication Union, Morton, A.C. (Editor) et al, Draft of New Recommendation G.IPP, Recommendation G.IPP "Performance Parameter Definitions for Quality of Speech and other Voiceband Applications Utilising IP Networks", Geneva, Sep. 22-30, 2003, 26 pages.
ETSI EG 202396-2 V1.1.1, Speech Processing, Transmission and Quality Aspects (STQ): Speech Quality Performance in the Presence of Background Noise; Part 2: Background Noise Transmission—Network Simulation—Subjective Test Database and Results, ETSI Standards, Sophia Antipolis Cedex, France, Sep. 2006, 62 pages.
USPTO, Parent U.S. Appl. No. 11/948,121, Office Action, NonFinal Rejection, Mar. 9, 2010, 10 pages.
Office Action mailed on May 20, 2011 in counterpart Australian Patent Application No. 2008331617.
Office Action mailed on Mar. 16, 2012 in counterpart GB Patent Application No. GB1007745.
International Preliminary Report on Patentability mailed on Jun. 10, 2010 in counterpart International Application No. PCT/US2008/083948.
Notice of allowance mailed on Jun. 3, 2010 in Parent U.S. Appl. No. 11/948,121, filed Nov. 30, 2007.

* cited by examiner

METHOD AND SYSTEM FOR PEER TO PEER WIDE AREA NETWORK COMMUNICATION

CROSS REFERENCE TO RELATED APPLICATION

This application is a divisional of U.S. application Ser. No. 11/948,121, filed Nov. 30, 2007 and assigned to Motorola, Inc.

FIELD OF THE DISCLOSURE

The present disclosure relates generally to wireless communication systems and more particularly to peer to peer wide area network communications within a wireless communication system.

BACKGROUND

A wide area network (WAN) is a network which covers a large geographical area, and use communications circuits and systems to connect the network nodes. "Wide area" coverage is defined by a number of fixed base stations which are typically distributed geographically over a large area and are connected over a wired network. Often these stations are distributed in such a way that no one station could cover the same geographic area by itself (however this isn't always the reason for such a wide area network). This enables a first mobile wireless radio within coverage of a first fixed base station to communicate with other (second, third, etc.) mobile wireless radios within coverage of remote fixed (second, third, etc.) base stations. Other types of units which can be on the wide area network (WAN) are console units—these are units where users can communicate to other console users as well as mobile radio users; however the console connects to the network over a wire rather than wirelessly.

Wireless wide area networks utilize communication technologies such as WIMAX (Worldwide Interoperability for Microwave Access), UMTS (Universal Mobile Telecommunications Service), GPRS (General Packet Radio Service), CDMA (Code division multiple access), GSM (Global System for Mobile communications), CDPD (Cellular Digital Packet Data), HSDPA (High-Speed Downlink Packet Access), 3G (third generation), 4G (fourth generation), and the like, to transfer data.

Within a wide area network, a variety of communication scenarios can co-exist. For example, one use of the wide area network is to enable a group call (i.e. one mobile radio user transmitting to many mobile radio users who are listening). Other examples of communication scenarios within a wide area network are a private call (i.e. one mobile radio user to one other mobile radio user), a short data call (e.g. text messaging), and an emergency call.

Low-tier, cost conscious markets (for example school districts, mass transit, construction companies, etc.) cannot typically support the expense of higher initial startup costs or high recurring fees within a network that higher tier markets can afford (for example, law enforcement, federal agencies, etc.). Further, these lower tier markets are typically willing to experience a slightly diminished level of reliability in order to save cost.

A means of lowering the most impacting aspect of cost is reducing recurring fees. Most wide area systems today rely on low delay, low jitter, low packet drop, low outage rate, T1's. The T1 (or T-1) carrier is a commonly used digital transmission service. It consists of twenty four (24) separate channels using pulse code modulation (PCM) signals with time-division multiplexing (TDM).

Reducing recurring costs that are incurred by monthly T1 fees can lower overall network costs. T1 and fractional T1's are an order of magnitude more expensive than Internet connections. The Internet is a worldwide, publicly accessible series of interconnected computer networks that transmit data by packet switching using the standard Internet Protocol (IP). It is a "network of networks" that consists of millions of smaller domestic, academic, business, and government networks, which together carry various information and services.

However the Public Internet suffers from several important limitations: it is higher delay than T1's; Internet jitter suffers from a statistically different distribution than T1's; Public Internet suffers from packet drop (drop is negligible on a T1); and T1 outages are at least an order of magnitude less frequent than the Internet.

Accordingly, there is a need for a method and system for enabling low cost wide area network (WAN) communication.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
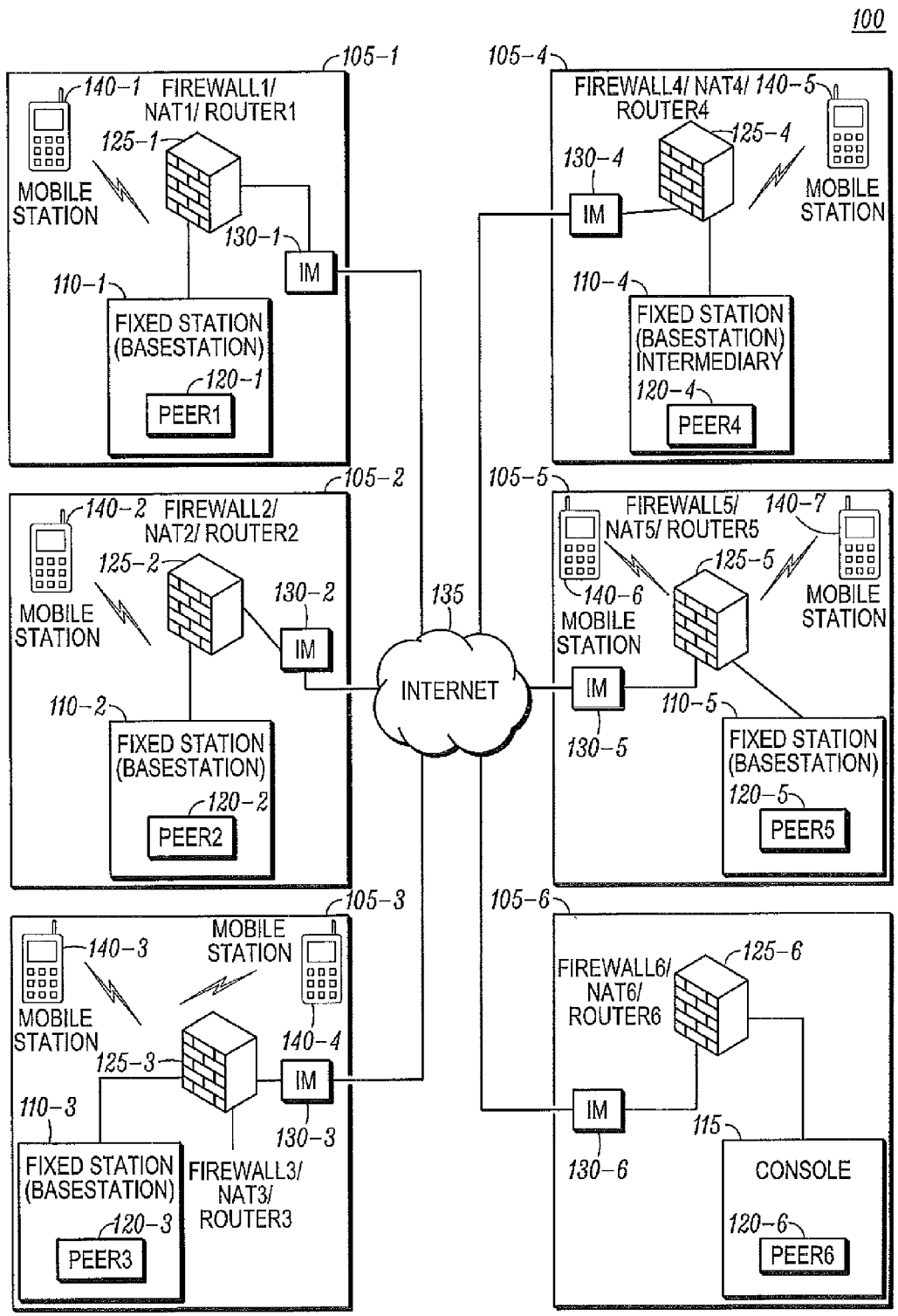
FIG. 1 is a block diagram of an example wide area network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides for the introduction of peer to peer (P2P) as a topology over the Internet. P2P is a topology where "Peers" talk directly without go-betweens. Peer-to-peer is a communications model in which each party has the same capabilities and either party can initiate a communication session. The present invention provides for embodying the Peer terminations in fixed base stations of a communication network. By providing peer to peer communications, the present invention enables mobile radio units that have both high over-the-air throughput rates like 802.11, 802.16, and the like. (see: http://standards.ieee.org/getieee802/index.html or contact the IEEE at IEEE, 445 Hoes Lane, PO Box 1331, Piscataway, N.J. 08855-1331, USA), as well as low bit rates such as is employed in European Telecommunications Standards Institute Digital Mobile Radio (ETSI DMR). Note that the rates for DMR are low enough as to require audio compression (i.e. Advanced Multi-Band Excitation (AMBE)+2).

A topology which utilizes direct network links between stations rather than to a centralized controller minimizes the higher delay seen on the Public Internet. Lowering delay also minimizes maximum jitter seen between Peers. Note that a centralized controller minimizes cost to the customer. Because packet drop cannot be avoided, jitter buffers must be made significantly long so that Public Internet packet drop is rarely an additional contributor to dropped communications. Also the P2P WAN must be resilient to outages and have the state machines instantiated in which links are automatically reestablished.

FIG. 1 is a block diagram of an example wide area network 100 in accordance with some embodiments of the present invention. As illustrated, the wide area network 100 includes a plurality of network locations 105-$n$, each geographically separated from the other network locations. For example, network location 105-1 can be in Japan, network location 105-2 can be the United Kingdom, network location 105-3 can be Columbia, network location 105-4 can be the United States, network location 105-5 can be Australia, and network location 105-6 can be Egypt. It will be appreciated by those of ordinary skill in the art that each of the plurality of network locations 105-$n$ can be located anywhere within the terrestrial earth; and further can be near or far from the other network locations in accordance with the embodiments of the present invention.

A fixed base station 110-$n$ can be located at each network location 105-$n$. For example, the fixed base station 110-1 is located at the network location 105-1, the fixed base station 110-2 is located at the network location 105-2, the fixed base station 110-3 is located at the network location 105-3, the fixed base station 110-4 is located at the network location 105-4, and the fixed base station 110-5 is located at the network location 105-5. Each fixed base station 110-$n$ is a base station that is a fixed (non-mobile), full-duplex, radio frequency (RF) (wireless) modem (capable of having both a transmit and a receive frequency pair) which receives control and media (data/voice) from one or more mobile radios and presents the control/media to an entity (the Peer) which typically coincides within the base station. The Peer sends the control/media to other Peers on the WAN. In turn, when the base station's Peer receives control/media from other Peers on the wire, the Peer forwards the control/media to the base station so that the base station may transmit the media wirelessly to the one or more mobile radios. Note that the terms "base station" and "fixed station" are synonymous terms as used herein.

A Console 115 can be located at one or more of the network locations 105-$n$. For example, as illustrated console 115 is located at network location 105-6. The console 115 is a wired-only device which receives control/media from a user and presents the control/media to the Peer functional unit; in turn the Peer functional unit receives control/media over the wire from other Peers and forwards control/media to the console so the control/media may be presented to the console user. Note the Peer functional unit and console typically coincide in the same physical unit.

A Peer 120-$n$, in accordance with some embodiments, is a functional unit located within each base station or console unit. For example, as illustrated in FIG. 1, Peer1 120-1 resides within base station 105-1, Peer2 120-2 resides within base station 105-2, Peer3 120-3 resides within base station 105-3, Peer4 120-4 resides within base station 105-4, Peer5 120-5 resides within base station 105-5, and Peer6 120-6 resides within the console 115. It will be appreciated by those of ordinary skill in the art that each Peer 120-$n$ can alternatively reside in a separate box, adjacent to the base station or console. The Peers 120-$n$ terminate the functions necessary to maintain the network with other Peers 120-$n$ on the WAN as well as interface the respective base station or console. Each Peer 120-$n$ enables WAN functionality over the Internet for the base station or console.

A Firewall/NAT/Router (FRN) 125-$n$ is an internet protocol (IP) network device which has combined firewall/NAT/router functionality, located at each network location 105-$n$. For example, FRN1 125-1 is located at the network location 105-1, FRN2 125-2 is located at the network location 105-2, FRN3 125-3 is located at the network location 105-3, FRN4 125-4 is located at the network location 105-4, FRN5 125-5 is located at the network location 105-5, and FRN6 125-6 is located at the network location 105-6. Within each network location 105-$n$, each Peer 120-$n$ interfaces with the respective FRN device 125-$n$ directly. The FRN 125 serves to provide a means of protection for the associated base station and console which sit on the Internet 135. A system topology where the units are connected over T1's doesn't require FRNs. The FRNs can complicate the functionality. For example, firewalls and many NATs don't allow packets to be received unsolicited from other hosts, computers, devices, etc. on the Internet 135. Most Internet connections are from a host behind an FRN 125 to a server which is not behind an FRN 125. In an embodiment of the present invention, the Peers 120 are behind the FRNs 125 which will block unsolicited packets unless a function is in place to obviate the problem.

Within each network location 105-$n$, an Internet Modem (IM) 130-$n$ is operatively coupled between the FRN 125-$n$ and the Internet 135. The IM 130-$n$ uses a standard interface to an Internet provider 135 (i.e. Data Over Cable Service Interface Specifications (DOCSIS), Digital subscriber line (DSL), Canopy, and the like).

Although not illustrated in FIG. 1, in an alternate embodiment the Peers 120-$n$ can be connected through T1's rather than the Internet 135.

Note that the WAN topology of FIG. 1 is for illustrative purposes, and that the WAN 100 can alternatively include any combination of tiered base stations and console. It will be appreciated by those of ordinary skill in the art that the WAN can consist of at least two "peered" base stations/consoles. For example, the WAN can consist of 2 or more base stations, 2 or more consoles, 1 base station and 1 or more consoles, 1 console and 1 or more base stations, more than one base station and more than one console; and the like.

Within each network location 105-$n$, one or more mobile radios 140-$n$ can communicate through the respective base stations and/or consoles to other devices within the WAN 100. For example, as illustrated mobile radio 140-1 is located within network location 105-1, mobile radio 140-2 is located within network location 105-2, mobile radios 140-3 and 140-4 are located within network location 105-3, mobile radio 140-5 is located within network location 105-4, and mobile radios 140-6 and 140-7 are located within network location 105-5.

Figure 2:
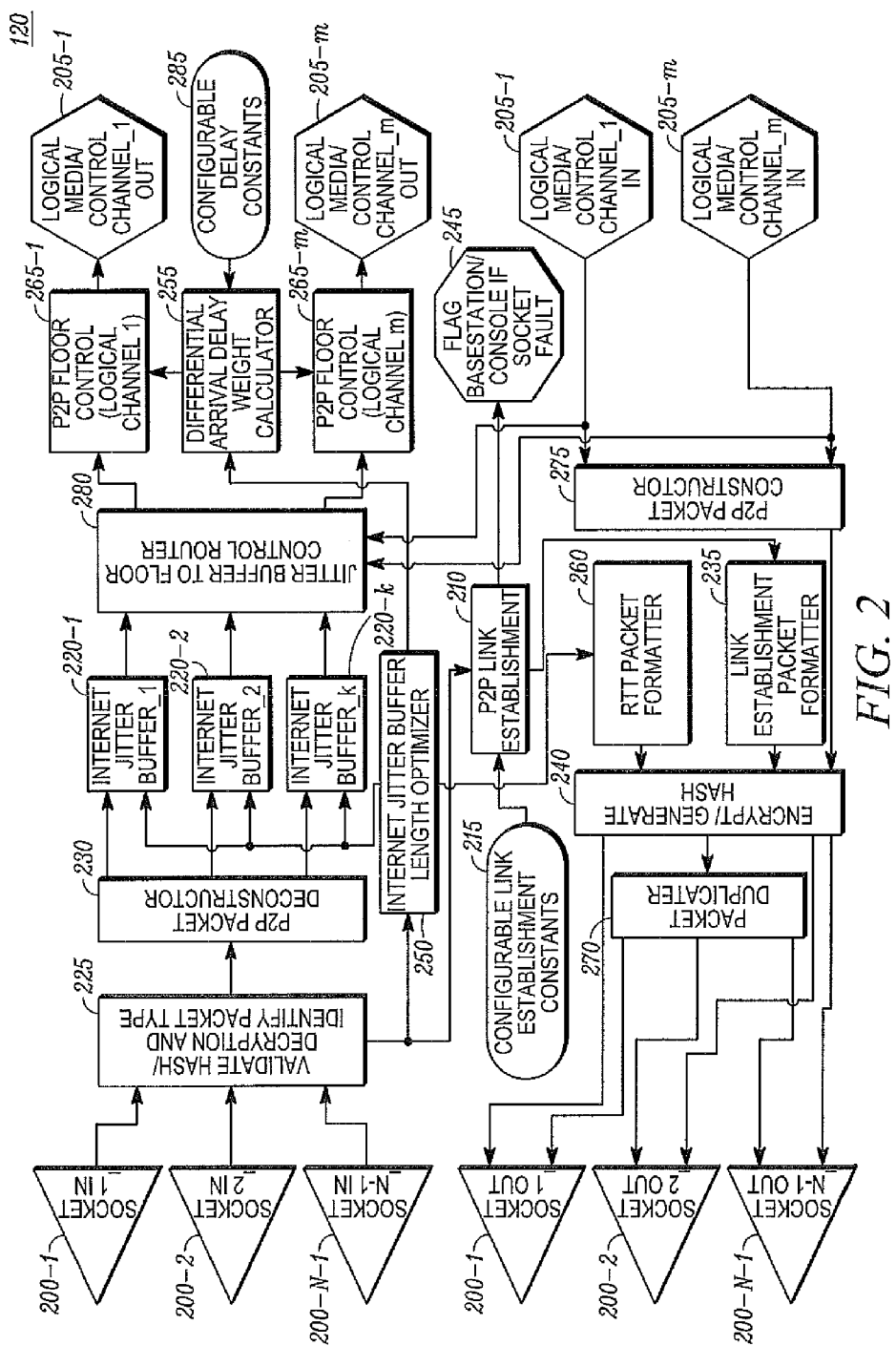
FIG. 2 is an example functional block diagram of a Peer operating within the network of FIG. 1 in accordance with some embodiments.

FIG. 2 is an example functional block diagram of a Peer 120 operating within the network 100 of FIG. 1 in accordance with some embodiments. As illustrated, the Peer 120 includes a plurality of sockets 200-1 through 200-N-1 including an associated input and an associated output. A socket 200 per standard Internet Protocol (IP) definitions requires that an IP Address be bound to a port number. A socket 200 is the portal through which a Peer 120 sends/receives IP packets to/from the Internet 135. In accordance with the topology of the present invention, all media and control transported between Peers 120-n is transported over IP/UDP (User Datagram Protocol). Note that the IP/UDP datagram protocol is composed of a source IP address and source UDP port as well as a destination IP address and destination UDP port. Therefore a Socket 200 is defined to include at least one destination IP Address/port number binding and at least one source IP address/port number binding. The source IP address is the IP address of the Peer.

Note in FIG. 2, there are at least "N-1" sockets 200, where "N" is the total number of Peers within the network. In WAN 100 example of FIG. 1, there are N total Peers. Therefore in the example there is one socket dedicated on Peer1 120-1 to transfer and receive packets to/from Peer2 120-2; there is one socket dedicated on Peer1 120-1 to transfer and receive packets to/from Peer3 120-3; and the like. It will be appreciated by those of ordinary skill in the art that a Peer 120 may have more than one socket assigned to another Peer (e.g. Peer1 120-1 can have two or three sockets with Peer2 120-2.) For example purposes, it is assumed that only one socket 200 is dedicated to another Peer. Also note that a source IP address/port number on a Packet sent from a Peer to another Peer may be translated by the FRN. For example, the source IP address and source port number on a packet sent from Peer1 120-1 to Peer2 120-2 might be translated by FRN 125-1; however the FRN 125-1 reverses the translation when packets are returned from Peer2 120-2 (as is known in the art). The existence of an FRN at each network location doesn't affect the fact that a socket on a Peer is dedicated for correspondence to/from one other Peer. In other words, the socket on a Peer represents the virtual path through which packets are communicated (sent to and received from) at least one other Peer.

Note that any given socket can be defined to interface a Peer on a private WAN (e.g. a Peer that isn't exposed to the Public Internet such as a Peer on an Enterprise network) or interface a publicly accessible Peer (e.g. a Peer on the Public Internet).

The Peer 120 also receives/sends media and control from/ to each base station or console through a Logical Media/ Control Channel 205. The base station/console in turn receives media/control (voice, data, control) from the mobile radio and console user respectively and presents the media/ control to the Peer entity through the Logical Media/Control Channel 205. The base station/console also receives media/ control from the Peer entity through the Logical Media/Control Channel 205 and then transmits the media/control to a group of mobile radios (for the case of the base station) or presents the media/control to the console user.

In the example of FIG. 2, there are "m" Logical Media/ Control Channels In, and "m" Logical Media/Control Channels Out per Peer. The number "m" is the number of Transport Resources maintained on the base station or console. In a DMR base station, there are two Transport Resources In, and two Transport Resources Out (i.e. two TDM slots per transmit frequency and two TDM slots per receive frequency), where each slot can potentially carry 60 milliseconds of audio. A Transport Resource can also carry data such as short message service (SMS) messages. If DMR were used, there would be m=2 Transport Resources for information sent to the base station from mobile radios and 2 Transport Resources for information sent from the base station to mobile radios. If the Peer were interfaced to a base station, 2 Logical Media/ Control Channels In would interface the 2 Transport Resources from which the base station received information from mobile radios; if the Peer were interfaced to a base station, 2 Logical Media/Control Channels Out would interface the 2 Transport Resources that would transmit information to mobile radios. Note that one of the Logical Media/ Control Channels would be mapped to one (possibly dynamically) Transport Resource on the base station. If the Peer interfaced a console, there would be "m" times some integer Transport Resources interfaced. Note that the Logical Media/Control Channel on a Peer within a DMR base station may be connected to TDM slot 1 or TDM slot 2 depending upon the dynamically multiplexed state within the base station (i.e. the Logical Media/Control Channel on a Peer need not be slaved to a specific TDM slot). However the Logical Media/Control Channel between the Peer and base station or between the Peer and console is always mapped to at least the Transport Resource on the base station (e.g. TDM slot) or console audio resource. Note that the term Transport Resource is generally assumed to be the Transport Resource on a base station (i.e. the radio resource or TDM slot number on the base station). Therefore during a call received on a base station it can be assumed that the Transport Resource Number on the base station from which the call is being received (e.g. TDM slot 1) and the Logical Media/Control Channel number on the Peer (e.g. Logical Media/Control Channel 1) mapped to that Transport Resource on the base station can be used interchangeably to represent the Transport Resource Number associated with the source of the media (and control).

Also, for the sake of efficiency it may be desirable to establish on each Peer one socket per destination Peer and Logical Media/Control Channel. Therefore in the example system with N=6 and two Logical Media/Control Channels, a Peer may establish 2*(6−1)=10 sockets.

One function within each Peer 120 is a peer to peer (P2P) Link Establishment function 210. The peer to peer (P2P) Link Establishment function 210 enables Peers to find each other when they are behind FRNs; and also to maintain connections with each other through FRNs.

One such Peer is designated to be the Intermediary; the others are not. The Configurable Link Establishment Constants 215 stores a minimum number of provisionable variables including (1) whether the Peer itself is an Intermediary; and (2) the static destination IP address and port number of the Intermediary.

The Intermediary can also be a Peer. The Intermediary's FRN has an open port and all non-Intermediary Peers register their source IP address and port number with the Intermediary. Peers register their source IP address and port number occasionally because all Peers except the Intermediary have dynamic IP addresses (dynamic IP addresses save customer expense over having a static IP). They also have closed ports on their FRNs. If a Peer boots up or is disconnected from the WAN due to link fault, the Peer will "rendezvous" with the Intermediary. The Peer registers its source IP address and port number and requests the IP address and port number of all other Peers registered on the WAN. The Intermediary then forwards the IP address and port number of the Peer which intends to join the WAN to all other Peers on the WAN. Upon receiving each IP address and port number of the other Peers on the WAN, the Peer which intends to join the WAN can create a Socket 200 and an Internet Jitter Buffer 220 for each such IP address and port number.

With respect to the flow of Link Establishment Packets through the Peer 120, each Link Establishment Packet can be received on any of the "N-1" sockets, Socket_1 200-1 through Socket_N-1 200-N-1, and run through the Hash Validator/Decrypter 225. This latter function then forwards the decrypted/authenticated packet to the P2P Packet Deconstructor 230 (assuming the packet is authentic; otherwise its dumped) before being given to the P2P Link Establishment 210 process. The P2P Link Establishment 210 processes the received Packet, generates a response signal and forwards the response signal to the P2P Link Establishment Packet Formatter 235 which generates a P2P link establishment packet to be sent to the Encryption/Hash Generation function 240. The Encryption/Hash Generation function 240 then sends the secure Link Establishment packet to the appropriate destination Socket, one of 200-1 through 200-N-1.

The Link Establishment function may also keep ports open on the FRN through UPnP (Universal Plug and Play) or by using TELecommunication NETwork (Telnet) to configure specific parameters.

Note that the topology and sequence of actions of the Link Establishment in the described embodiment enable:
1. secure P2P Link Establishment through today's FRNs
2. automatic P2P Link Establishment and link maintenance given the occurrence of link fault and Peer reboot
3. dynamic IP addresses for all Peers but the Intermediary which minimizes cost to the customer
4. minimum customer provisioning
5. IP-inexperienced customers to plug-and-play with any FRN The P2P Link Establishment function 210, if it detects a socket fault 245, notifies the base station or console in order that the base station may choose to go to local repeat or alarm the local console operator.

The Internet Jitter Buffers 220 are set to accommodate the "worst case" jitter seen on the Internet 135. When the jitter is exceeded beyond this "worst case" a packet drop occurs and the media/control is lost. Jitter is equal to differential delay between delay samples. Jitter is equal to: $J(n+1)=D(n+1)-D(n)$. However the worst case jitter can never be found exactly because the delay sampled on the internet makeup a statistical distribution. Therefore the Internet Jitter Buffer Length Optimizer 250 evaluates the (99+x) % worst jitter where $0<=x<1$. The higher the value of x, the less often a packet drop shall occur.

The Internet Jitter Buffer Lengths are set to:
at least the (99+x) % worst $J(n+1)$ evaluated between any of the Peers, plus;
worst case serialization jitter by any sending Peer;
rounded up to the next highest integer multiple of the real-time media rate.

For example if Peer1 120-1 was evaluating "worst case" Jitter, it would find it by finding the (99+x) % worst Jitter in the following series:

$[J(n_2+1)_{Peer1-to-Peer2}, J(n_3+1)_{Peer1-to-Peer3}, \ldots, J(n_N+1)_{Peer1-to-PeerN}]$ for all $n_i$ where i=the number of the other Peer.

This is the same as evaluating a (99+x) % worst jitter between Peer1 and all other Peers, Peer2 through PeerN.

Therefore if:
10,000 samples of Jitter were calculated between Peer1 and Peer2,
5,000 samples of Jitter calculated between Peer1 and Peer3;
15,000 samples of Jitter calculated between Peer1 and PeerN, and;
x=0.9

The thirtieth (30000*0.001) worst Jitter sample would be used in the above set of 30,000 Jitter samples. If that value were 110 msecs, the worst case serialization delay was 60 msecs and the frame rate was 60 msecs, all Internet Jitter Buffers would be set to 180 msecs (i.e. nextHighestMultiple$_{60}$[110+60]).

The Internet Jitter Buffer Length Optimizer 250 evaluates the delay by sending to each destination Peer a timestamped Round Trip Time packet (call this $RTT1_{timestamp}$). Each destination Peer upon receiving the $RTT1_{timestamp}$ packet quickly routes the packet back to the Peer which sourced the $RTT1_{timestamp}$ packet (call this RTT2). The Peer which sourced the $RTT1_{timestamp}$ packet, upon receiving the returned RTT2 packet from the destination Peer, checks its local clock (i.e. $RTT2_{arrivalTime}$) and halves the total elapsed time i.e. $(RTT2_{arrivalTime}-RTT1_{timestamp})/2$. This is now D(n). The source Peer does this again and calculates D(n+1). J(n+1) can be calculated. The Peer calculates hundreds of thousands of D(n) values, periodically, to get a significant statistical sampling. The worst (99+x) % J(n+1) calculated through any of the "N-1" sockets 200 determines the length of all of the Internet Jitter Buffers 220. Each RTT1 and RTT2 packet is encrypted/hashed before being sent to the destination Peer; each RTT1 and RTT2 is decrypted/authenticated upon its reception. Note that in the figures, RTT can represent either an RTT1 or RTT2 packet.

The Internet Jitter Buffer Length Optimizer 250 also retains the D(n) values to factor into the P2P Floor Control functions 265. The Internet Jitter Buffer Length Optimizer 250 retains the (99+y) % worst delay value where $0<=y<1$. This delay is presented to the Differential Arrival Delay Weight Calculator 255. The Differential Arrival Delay Weight Calculator 255 also receives Configurable Delay Constants 285 such as the media frame rate. The Configurable Delay Constants 285 can be provisioned by the WAN owner. The media frame rate is the rate at which media must be packetized and presented on the Internet to maintain a real time stream. The Differential Arrival Delay Weight Calculator 255 determines the length of the Floor Control Window (in msecs). The length is at least a function of the:
1. (99+y) % worst delay evaluated;
2. the media frame rate;
3. a multiplier Note the media frame rate is the worst case serialization delay that a Peer can allow and still maintain the overall rate necessary to sustain real-time audio transfer. For DMR, the media frame rate is 60 msecs (one DMR TDM slot=60 msecs of audio). If the Peer cannot process one source 60 msec frame of AMBE audio received from one Logical Media/Control Channel 205, make "N-1" packet duplications of one 60 msec frame of DMR audio and send all of the duplicated packets to all "N-1" Peers within 60 msecs, the overall real-time audio transfer rate will fail and the real-time stream cannot be maintained to all of the other Peers. Note that it is possible that a differential delay will occur when a Peer sends one of the duplicated packets to the first of the "N-1" Peers and the time the Peer sends the last of the duplicated packets to the last "N-1" Peer; as just mentioned, this worst case differential delay cannot be more than what the real-time budget will allow, which for DMR is 60 msecs.

The flow of data from a base station which received media/control from a mobile radio (or audio from a console user) will be described hereinafter.

Media (voice, data) is received from a Logical Media/Control Channel 205. The Logical Media/Control Channels 205 can also carry embedded control signaling associated with the media such as Destination Talkgroup, (TG), Call Type (Group or Private call), Priority (such as emergency), Source Mobile Radio Identification (ID), Transport Resource ID or Number (e.g. DMR TDM slot number equal to 1 or 2), etc.

Figure 3:
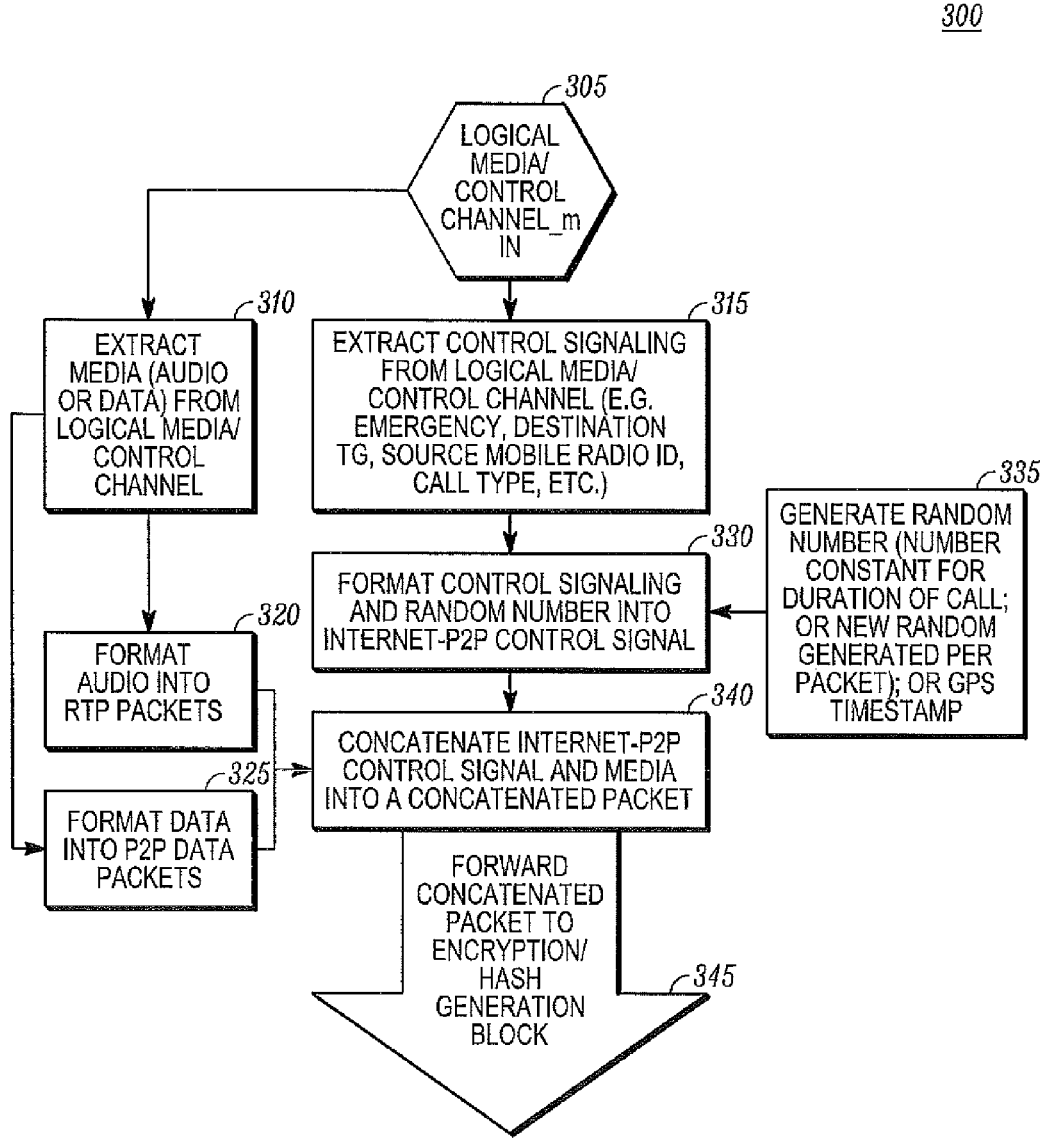
FIGS. 3 through 5 illustrate various operations of the Peer of FIG. 2 in accordance with some embodiments.

FIG. 3 illustrates the operation 300 of the Peer 120 of FIG. 2 in processing information from a Logical Media/Control Channel 205. As illustrated, in Step 305, a Logical Media/Control Channel 205 presents information to the Peer 120. Next, the Peer 120 extracts (from the Logical Media/Control Channel 205) the media (audio or data) in Step 310; and extracts (from the Logical Media/Control Channel 205) the control signaling (e.g. Priority [emergency], Destination Talkgroup (TG), Source Mobile Radio ID, Call Type, Transport Resource Number [e.g. TDM slot number] and the like) in Step 315. Following Step 310, the media which is audio gets formatted into Real-time Transport Protocol (RTP) packets (in the P2P Packet Constructor 275) in Step 320. Next, in Step 325, the media which is data gets formatted into P2P Data Packets (in the P2P Packet Constructor 275).

Returning to Step 315, next, in Step 330, the control signaling is formatted into Internet-P2P Control Signaling (in the P2P Packet Constructor 275). Note that, as illustrated in Step 335, a Random Number is generated which gets formatted with the Internet-P2P Control Signaling in Step 330 (in the P2P Packet Constructor 275). In one embodiment the Random Number generated in Step 335 can remain constant for the length of the call that is received from the mobile radio (or the length of the call from the console user). Alternatively, the Random Number can be newly generated on a TDM slot-by-slot basis (i.e. every 60 msecs). The Random Number is used by P2P Floor Control 265-$m$ to resolve packet inter-arrival conflicts within the Floor Control Window. It will be appreciated by those of ordinary skill in the art that a Global Positioning Systems (GPS) timestamp would also resolve inter-arrival conflicts and can replace the Random Number field in the Internet P2P Control Signaling.

Following Steps 320, 325, and 330, in Step 340, the Internet-P2P Control Signaling and Formatted RTP and/or P2P Data (Formatted Media) get concatenated into an Internet-P2P Control Signal and Media Packet (in the P2P Packet Constructor 275). In Step 345, this latter packet gets forwarded to the Encryption/Hash Generation Block 240 (to be discussed with respect to FIG. 4 herein after).

Figure 4:
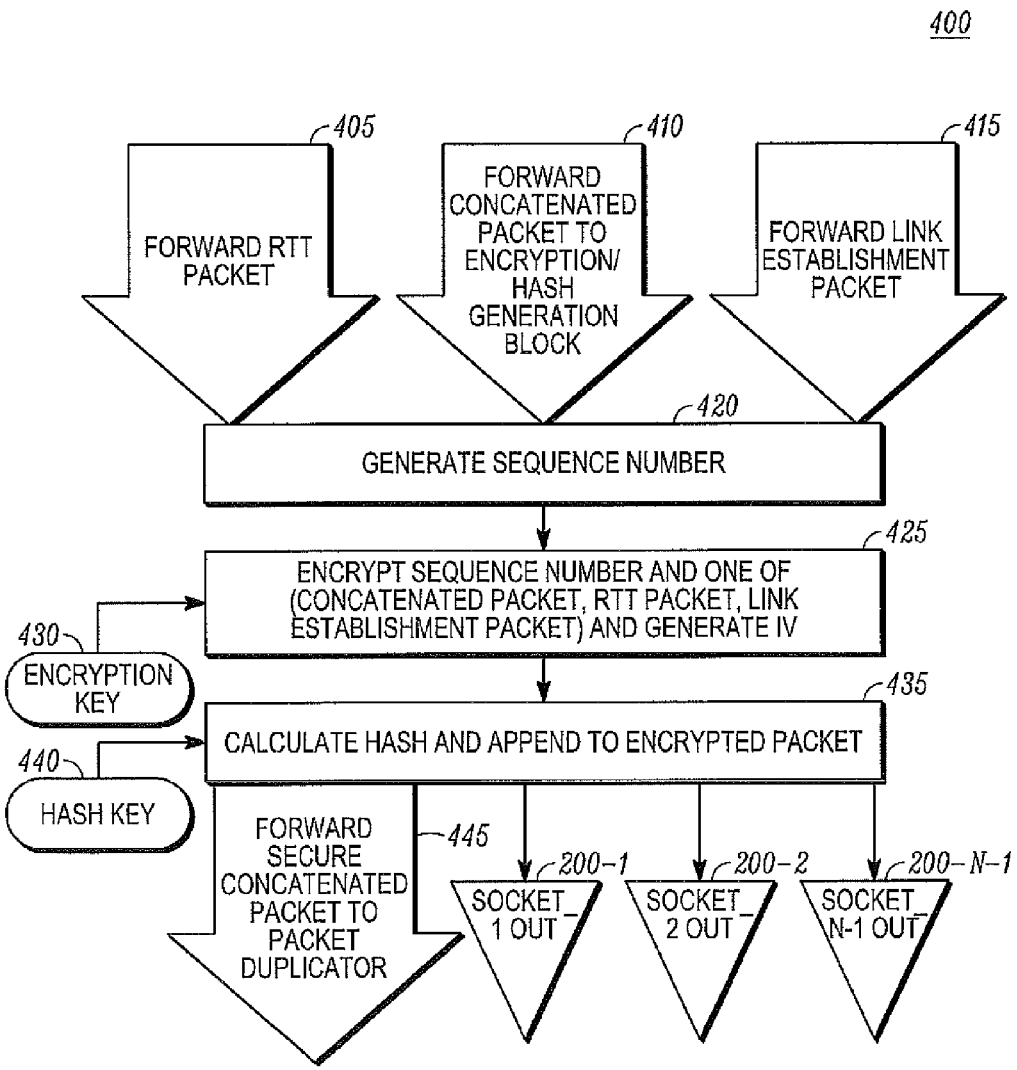

FIG. 4 illustrates an embodiment of a security operation 400 of the Peer 120 of FIG. 2. Specifically, FIG. 4 illustrates the Encryption/Hash function 240 in the Peer 120. It will be appreciated by those of ordinary skill in the art that the security layer is situated uniquely to minimize processing load, work through any type of FRN transparently, and work with dynamic IP addresses.

The packets which are to be sent securely out of the Peer 120 are processed through the functions in FIG. 4. Specifically, upon receipt of a forward Round-Trip Time (RTT) packet 405 from the RTT Packet Formatter 260, a forward concatenated Internet-P2P Control Signal and Media Packet (also termed "Concatenated Packet") 410 from the P2P Packet Constructor 275, or a forward Link Establishment packet 415 from the Link Establishment Packet Formatter 235, the Peer 120 generates a Sequence Number (to combat replay attack) in Step 420. Next, in Step 425, the Peer 120 encrypts a Sequence Number and one of (Concatenated Packet 410, RTT Packet 405, Link Establishment Packet 415) and generates an Initialization Vector (IV) using an encryption key 430. Any encryption function can be used (Advanced Encryption Standard (AES), Triple Data Encryption Standard (3DES), and the like). The encryption key 430 is used to encrypt. This key is common among all Peers in the topology. The encryption key 430 can be optionally pre-shared and provisioned by the WAN owner.

Next, in Step 435, the Peer 120 calculates the hash and appends the Hash to the Encrypted Packet using a hash key 440. The hash key 440 is common among all Peers in the topology. The hash key 440 can be optionally pre-shared and provisioned by the WAN owner. The hash key 440 is appended, pre-pended or both to the encrypted data before the hash is calculated. The hash is calculated over a concatenation of the key, the Encrypted Sequence Number, the Encrypted Packet (where one of the following was encrypted: Concatenated Packet, RTT Packet, Link Establishment Packet), and the Initialization Vector (IV).

Note the hash key 440 may appear multiple times in the concatenated sequence before the hash is calculated. Secure Hash Algorithm (SHA)-1 is an example hash function. It will be appreciated that there other functions which have hash functions within hash functions and employ keys. Regardless, a hash which depends on a key is one embodiment of the present invention. In an alternative embodiment, the hash is calculated before being encrypted. If the packet was media or control from the base station or console, the secure packet is forwarded to the Packet Duplicator 270 in Step 445. Otherwise, if the secure packet is a secure RTT or Link Establishment packet, it is sent directly out one of the destination sockets (i.e. one of the sockets 200-1 through 200-N-1) for which it was destined. Note that a packet is considered secure after the encryption has been completed on the packet and the IV and Hash have been generated and appended to the Encrypted Packet.

Note that in another embodiment, the concatenated packet can bypass the Encrypt/Generate Hash block 240 entirely and the entire topology can rely on external secure routers to securely transport IP packets over the Internet. In this embodiment, packets are forwarded around the Encrypt/Generate Hash block 240 to the Packet Duplicator block 270.

Figure 5:
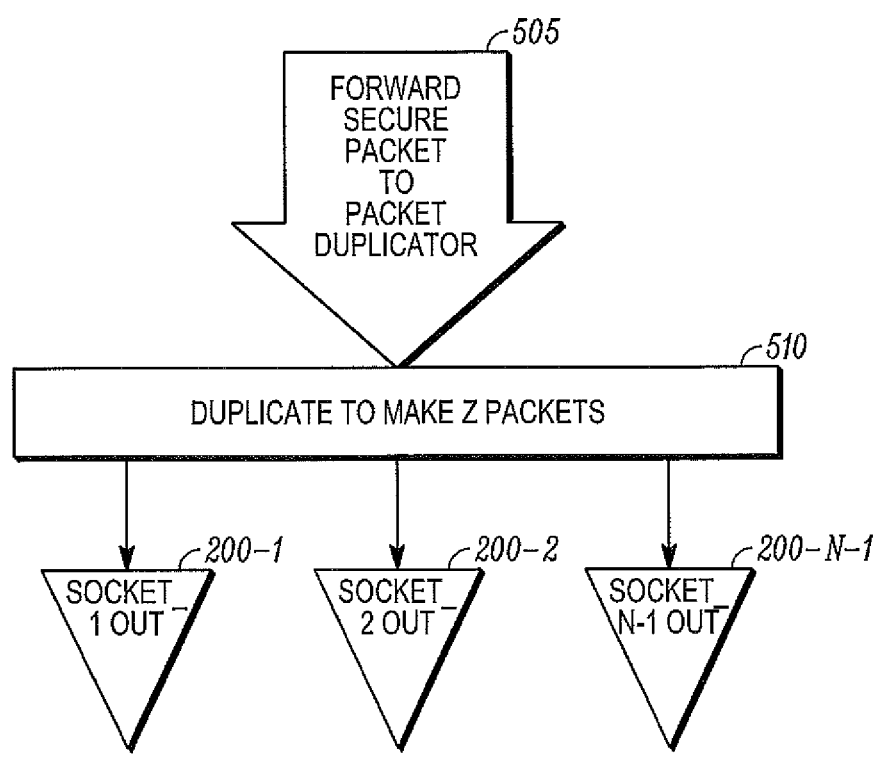

FIG. 5 illustrates an operation 500 of the Peer 120 of FIG. 2 in processing a Secure Packet. As illustrated, the Secure Packet is forwarded to the Packet Duplicator 270 in Step 505. Next, in Step 510, the Secure Packet is duplicated to make Z IP/UDP packets. Z is chosen to be some number greater than or equal to N-1. Because of reliability issues of IP/UDP, packets can be sent more than once to any of the N-1 Peers. Next, the Duplicated Packets are sent out on each destination Socket (i.e. Sockets 200-1 through 200-N-1). The Socket assigns the source and destination IP Address/port number to the packet.

Each media and control received from any one of the "m" Logical Media/Control Channels 205 ultimately gets sent on all "N-1" destination Sockets (i.e. Sockets 200-1 through 200-N-1). It will be appreciated by those of ordinary skill in the art that the Internet does not support multicast between Internet providers. Therefore all information is packet duplicated at least "N-1" times and sent unicast to all other Peers, Peer-to-Peer, in order for that information to reach all the other Peers on the Public Internet. The destination Peers then receive the media/control without any middle device introducing extraneous delay or jitter. Therefore, for example, one TDM slot of 60 msecs of audio received from Logical Media/Control Channel 2 on Peer1 is ultimately packet duplicated at least five (5) times and sent to Peer2 through Peer6 on Peer1's Socket_1 through Socket_5 respectively.

In another embodiment, the Packet Duplicator block 270 can have a combination of unicast packet duplication and multicast packet duplication. For example, if it were known that the Peer was on a WAN that connected to both the Public Internet and a private WAN (e.g. an Enterprise WAN), some packets could be duplicated for unicast IP transmission on the Public Internet; while other packets could be duplicated (i.e. one or more) as multicast packets and sent on the private WAN.

Figure 6A:
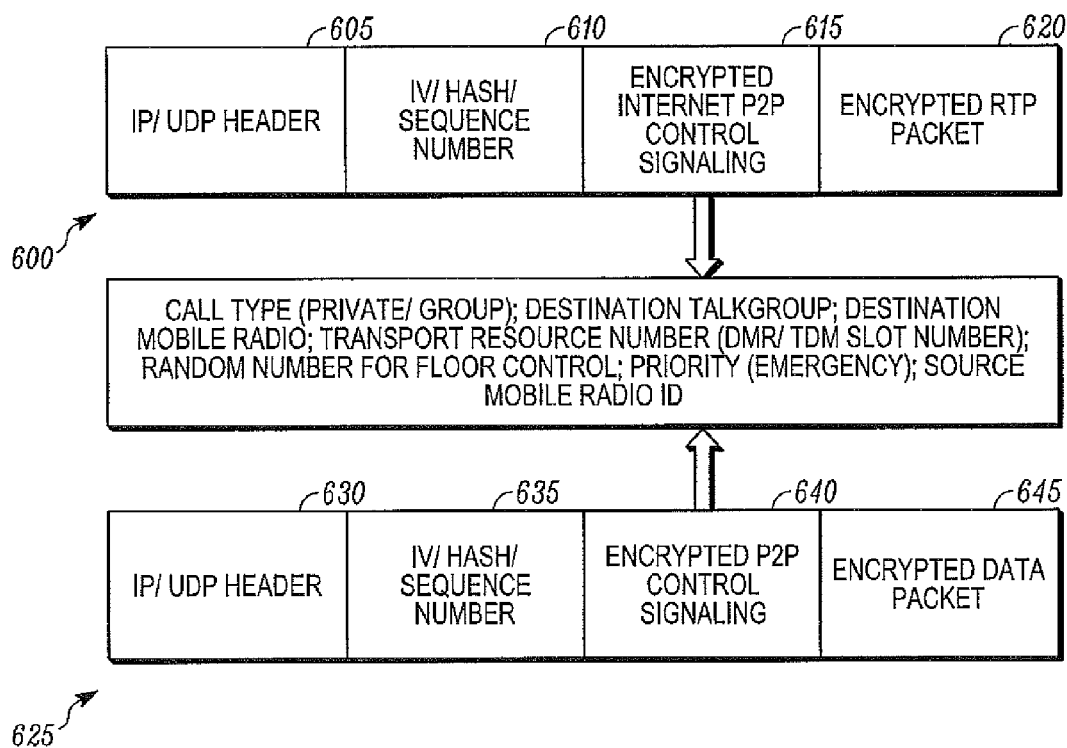
FIG. 6A and FIG. 6B illustrate examples of the structure of packets which results from the operations of FIGS. 3 through 5 in accordance with some embodiments.
Figure 6B:
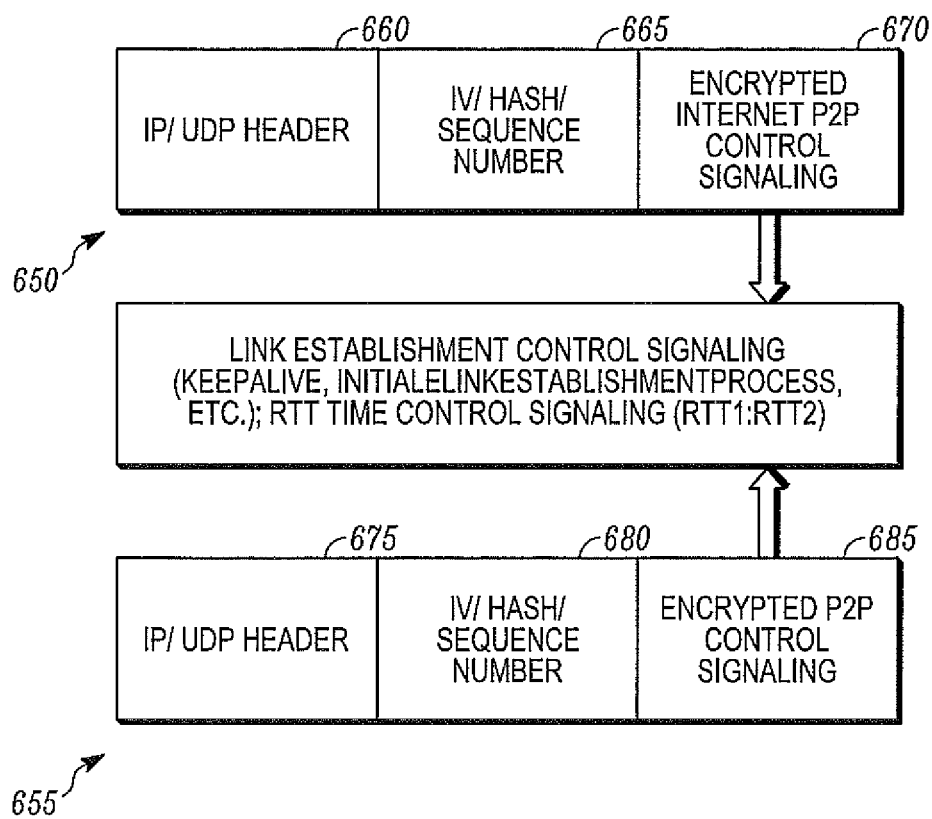

FIGS. 6A and 6B illustrate an example of the structure of a packet 600 which results from the operations of the Peer as previously described herein with regards to FIGS. 3 through 5.

The security protocol herein has been customized primarily to enable simple implementation with minimal compromise to security. Additional benefits of this security protocol is transparency to today's FRNs (it will work through any FRN) and independence on IP address or UDP port numbers. IP address/port number independence is key to relieve the need to encrypt/hash the packet one time for each destination Peer. For example, with this system, encrypting/hashing is done once regardless of the number of the Peers. This minimizes Central Processing Unit (CPU) load as the system scales to large "N". Encrypting/hashing once, regardless of the number of the Peers in the WAN (i.e. the secure stack of this embodiment is scale independent) relieves CPU strain on the source Peer. Also IP address independence means it will work with dynamic IP addresses or Network Address Translators (NATs). Also the secure protocol is streamlined to minimize packet overhead and conserve upstream bandwidth (no tunneled IP packet headers akin to Internet Protocol Security (IPSEC) tunneling). In one embodiment of the present invention, the hash is calculated after encryption to save CPU burden on the Peers (decryption need not be run if authentication fails). Alternatively, the hash could be calculated before encryption though for added security.

As illustrated in FIG. 6A, the packet 600 begins with an Internet Protocol (IP)/User Datagram Protocol (UDP) header 605. Following the IP/UDP header is a IV/Hash/Sequence Number 610. Next, is the encrypted Internet-P2P Control Signaling 615. Lastly is the encrypted RTP packet 620.

When the information is a data packet, the packet 625 begins with an Internet Protocol (IP)/User Datagram Protocol (UDP) header 630. Following the IP/UDP header is a IV/Hash/Sequence Number 635. Next, is the encrypted, Internet-P2P Control Signaling 640. Lastly is the encrypted Data Packet 645.

In standard OSI layering, RTP traditionally immediately follows UDP. In the present invention's stack, the packet is authenticated and decrypted first when received by the Peer. The receiving Peer then decides on how to act upon the packet contents i.e. determine if the packet is an RTT type packet, a Link Establishment type packet or a media (RTP/data or "Concatenated") packet. If it is media, actions upon the media are determined as is dictated by the Internet-P2P Control Signaling 615/640 (e.g. evaluate the media priority (e.g. emergency); destination Internet Jitter Buffer (e.g. slot number and source Peer Socket [if one socket per Peer]; socket number only [if one socket per Peer-Logical Media/Control Channel pairing]); Random Number (or GPS timestamp)—this is used by the Floor Control process; Call Type (group/private); etc.) Then the media is extracted. This a new stack for this P2P topology.

FIG. 6B illustrates an example of the structure of a Link Establishment packet 650 and a RTT packet 655 which results from the operations of the Peer as previously described herein.

Both of the above packets in FIG. 6B constitute non-media (voice/data) packet types. However these packet types are embedded within IP/UDP just as the aforementioned media type packets were. Furthermore, these latter packets adhere to the same security stack protocols that the media type packets do.

As illustrated in FIG. 6B, the Link Establishment packet 650 includes an IP/UDP Header 660, followed by an IV/HASH/SequenceNumber 665, followed by an encrypted Internet P2P Control Signaling 670. The RTT packet 655 includes an IP/UDP Header 675, followed by an IV/HASH/SequenceNumber 680, followed by an encrypted P2P Control Signaling 685.

Figure 7:
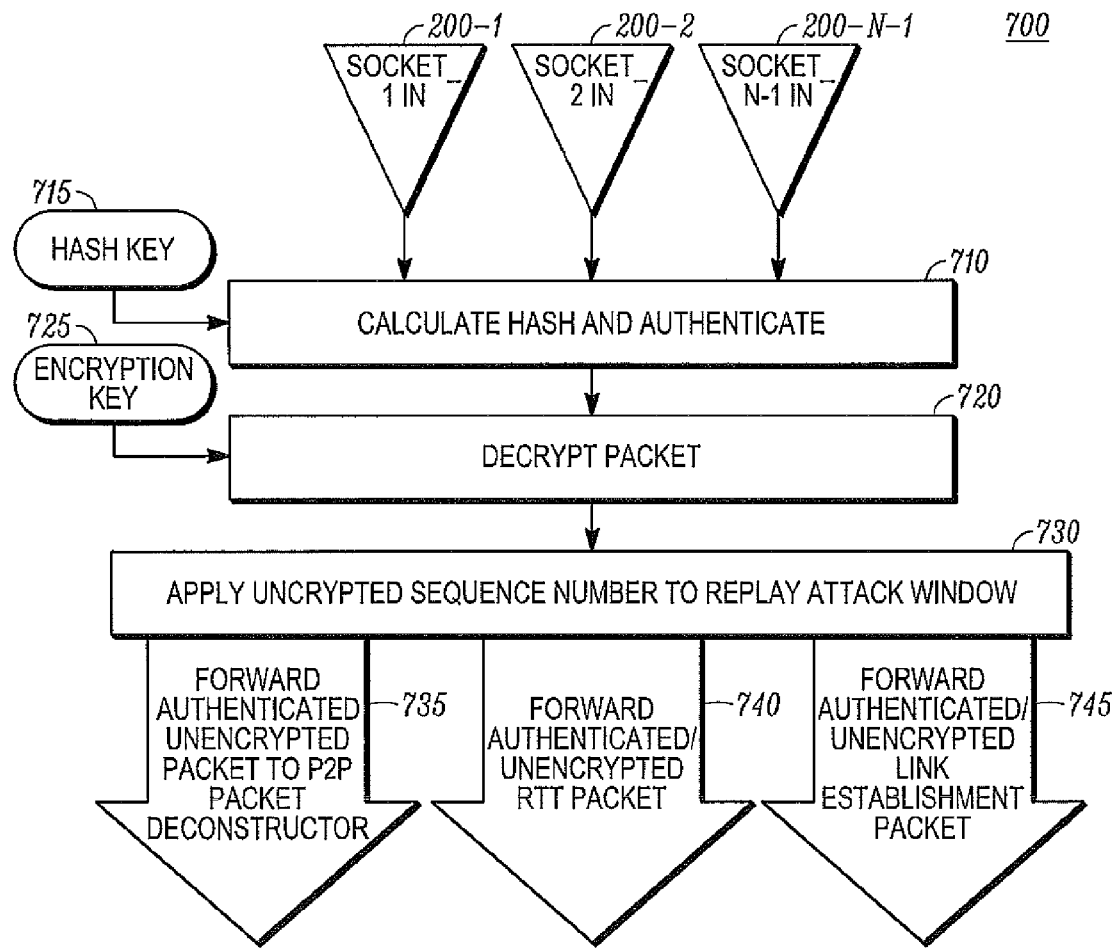
FIG. 7 is a functional block diagram in accordance with some embodiments.

FIG. 7 illustrates an example of the operation 700 of the Peer 120 of FIG. 2 in processing packets received by the Peer 120 from the Internet 135. As illustrated, the packets can be received into any one of the "N-1" Sockets (i.e. sockets 200-1 through 200-N-1). Upon receiving an IP packet from the Internet, the IP packet is first authenticated, decrypted and verified (in block 225 of FIG. 2) against the replay attack window as will be described hereinafter.

The authentication process begins with Step 710 in which the Peer 120 which received the IP packet, calculating the hash using a hash key 715 as previously described with respect to FIG. 4 (in other words the receiving Peer calculates the hash just as the sending peer had done). The receiving Peer calculates the hash over the same bytes the sending Peer calculated the hash. The receiving Peer then compares the hash received from the sending Peer to what was calculated. They must match exactly otherwise the entire IP packet is considered inauthentic and thrown out.

Next, in Step 720, the packet is decrypted using an encryption key 725. Next, in Step 730, after decrypting the packet, the packet is verified against a standard replay attack window as is known in the art. If the packet succeeds all of these secure gates, the authenticated, unencrypted packet is identified as being either a Link Establishment Packet; a RTT Packet; or a Concatenated Packet (i.e. Concatenated Internet-P2P Control and Media Packet) and forwarded to the respective process. In other words, a Link Establishment Packet is forwarded to the P2P Link Establishment process 210 (Step 745); a RTT Packet is forwarded to the Internet Jitter Buffer Length Optimizer 250 (Step 740); and a Concatenated Packet to the P2P Packet Deconstructor 230 (Step 735).

Figure 8:
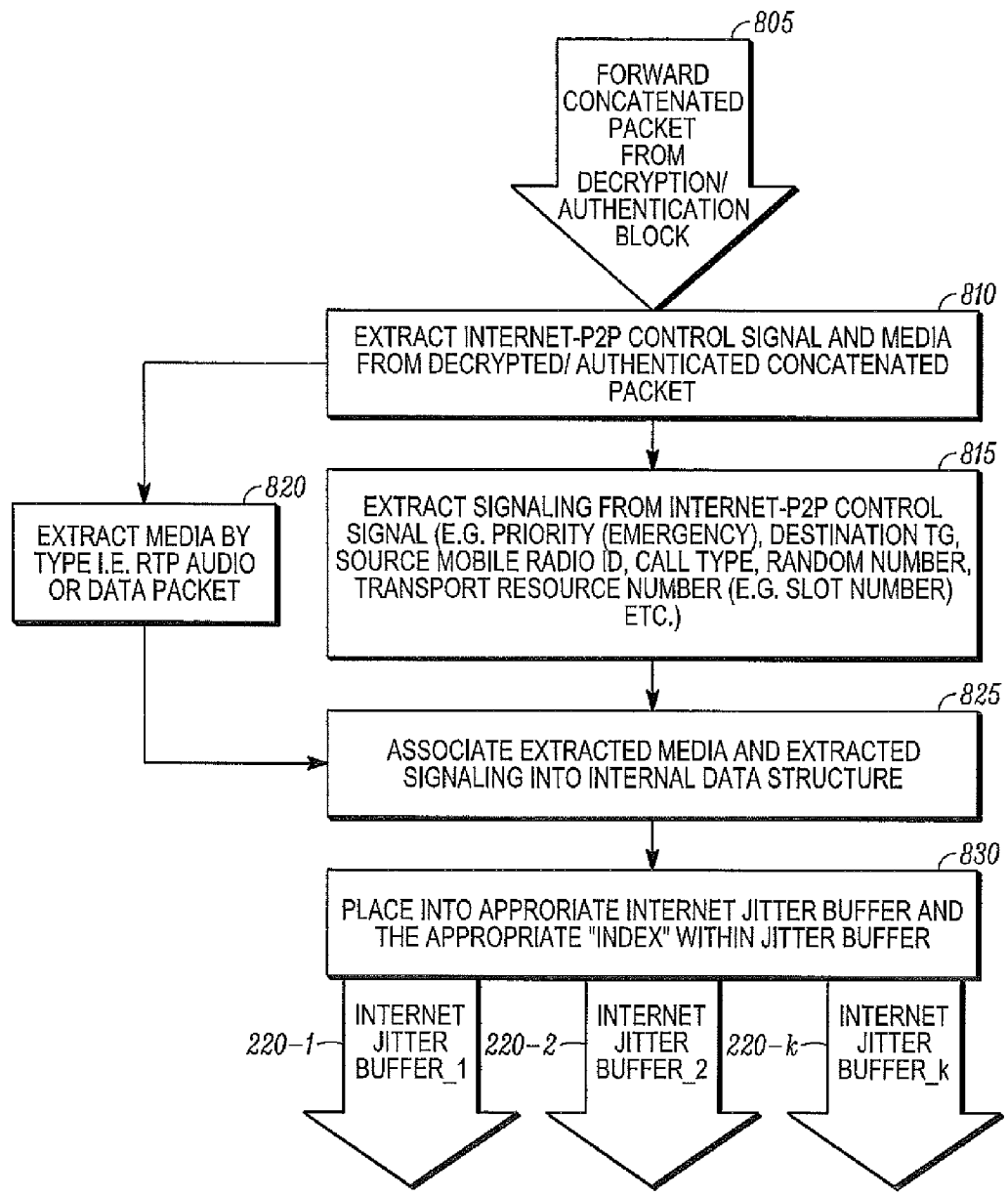
FIG. 8 is a functional block diagram of an example Peer to Peer (P2P) Packet Deconstructor in accordance with some embodiments.

FIG. 8 is a functional block diagram of an example P2P Packet Deconstructor 230 in accordance with some embodiments. As illustrated in FIG. 8, at Step 805, a Concatenated Packet is forwarded to the P2P Packet Deconstructor 230 from the decryption/authentication block 225. Next, in Step 810, the P2P Packet Deconstructor 230 extracts Internet-P2P Control Signal and Media from the Decrypted/Authenticated Concatenated Packet. Next, in Step 815, the P2P Packet Deconstructor 230 extracts signaling from the Internet-P2P Control Signal (e.g. Priority [e.g. emergency], Destination Talkgroup, Source Mobile Radio ID, Call Type [group/private], Random Number, Transport Resource Number [e.g. slot number], etc.). In parallel, the P2P Packet Deconstructor 230 extracts Media by type (i.e. RTP Audio or Data Packet) (note: the Data Packet can carry an SMS message) in Step 820. Next, in Step 825, the P2P Packet Deconstructor 230 associates the extracted media from Step 820 and the extracted signaling from Step 815 into an Internal Data Structure. Next, in Step 830, the P2P Packet Deconstructor 230 places the Data Structure into the appropriate Internet Jitter Buffer 220-k and the appropriate "index" within the Jitter Buffer using some protocol (e.g. RTP). Note that the Internal Data Structure, as well as the components of the Internal Data Structure (i.e. the extracted information which includes extracted media and extracted signaling), also remain associated with the original copy of the Concatenated Packet, source IP Address/port number of the Peer from which the Concatenated Packet originated (i.e. was sent on the WAN) and the Socket from which the Concatenated Packet was received.

The P2P Packet Deconstructor 230 knows to which Internet Jitter Buffer 220 to place the Data Structure based upon the source Transport Resource Number or slot number that was present in the Internet-P2P Control Signal field, and the source IP Address/Port from which the components of the Data Structure were sent. Each Internet Jitter Buffer 220 corresponds to a pairing of the Data Structure's Transport Resource Number (or slot on the base station which received the media) with the source IP Address/Port from which the components of the Data Structure were sent (i.e. the source IP Address/Port in the packet header in which the components of the Data Structure were sent). This pairing can be mapped to the source Peer's Logical Media/Control Channel In(put) 205 from which the components of the Data Structure were sourced; there is one Internet-P2P Jitter Buffer 220 for each Logical Media/Control Channel In(put) 205 on each Peer not including those resident on itself.

For example, if the P2P Packet Deconstructor 230 was on Peer6, Peer6's P2P Packet Deconstructor 230 can place a Data Structure received from Peer1's Logical Media/Control Channel_2 In(put) in Peer6's Internet P2P Jitter Buffer_2 220-2. If the P2P Packet Deconstructor 230 was on Peer6, Peer6's P2P Packet Deconstructor 230 can place a Data Structure received from Peer5's Logical Media/Control Channel_1 205-1 in Peer6's Internet P2P Jitter Buffer_9. Basically each Internet Jitter Buffer is storing one source stream of audio that was sourced by one Logical Media/Control Channel In(put) on one Peer.

When the P2P Packet Deconstructor 230 places the Data Structure into the appropriate Internet Jitter Buffer 220, the P2P Packet Deconstructor 230 takes into account Internet packet drop, Internet packet duplication, and out of order packet arrival from the Internet.

RTP is a standard protocol in which the P2P Packet Deconstructor 230 can apply to account for these Internet susceptibilities. Because RTP uses a sequence number, RTP puts the Data Structure into the appropriate relative position in the Internet Jitter Buffer 220. If a duplicate arrives, RTP can recognize this by a duplicate sequence number; RTP shall then throw the duplicate out. If RTP voice packets arrive out of order, RTP uses the sequence number to place in the correct order in the Jitter Buffer array.

There are k=m(N-1) Internet Jitter Buffers 220. This is because there are "m*N" possible independent media calls which can concurrently occur on the WAN at any one time i.e. all "m*N" Logical Media/Control Channel In(puts) can become busy with a call simultaneously. The number "k" is the number of Logical Media/Control Channel In(puts) that exist on the WAN not including the Logical Media/Control Channel In(puts) that exist on the Peer on which Internet Jitter Buffers reside. Note that "m" of the "m*N" independent calls which can be received simultaneously on the WAN can be received locally on the Peer's Logical Media/Control Channel In(puts). The local media/control doesn't require a jitter buffer because it is received as circuit data from the base station/console. However the other "k" independent calls are received as packet data and therefore must be buffered to account for worst case jitter. The Buffers have been made long enough to account for "worst case" jitter as optimized by the Internet Jitter Buffer Length Optimizer. Once the Internet Jitter Buffers are filled, the oldest Data Structure of media can be forwarded to the next process, the Jitter Buffer to Floor Control Router 280.

This latter function applies a set of rules to direct the Data Structure from the appropriate Internet Jitter Buffer 220-k to the appropriate P2P Floor Control process 265-m. Because the P2P Floor Control process 265 is typically slaved to one particular Logical Media/Control Channel Out 205, once the Data Structure is assigned to a P2P Floor Control Process 265 there is typically only one possible Logical Media/Control Channel Out 205 to which the Data Structure can possibly be directed. Media/Control received at the inputs of the local base station/console are also fed into the decision criteria of the Jitter Buffer to Floor Control Router 280 (i.e. the local Media/Control is sent directly from the Logical Media/Control Channel In(puts) 205 to the Floor Control Router 280).

The following is the set of rules which can be applied by the Jitter Buffer to Floor Control Router 280 to each Data Structure pulled from the Internet Jitter Buffers 220-k and the Logical Media/Control Channel In(puts) 205 so as to direct the Data Structure to the appropriate P2P Floor Control process 265:

1. The Destination Talkgroup or the Source Mobile Radio Identification that was designated in the Internet-P2P Control Signal can be slaved to a set of specific Logical Media/Control Channel Out(puts) and their respective P2P Floor Control Process(es). For example, Data Structures with odd numbered Destination Talkgroup ID's can be slaved to P2P Floor Control_1 process; all Data Structures with even numbered Destination Talkgroup ID's can be slaved to P2P Floor Control_2 process. Ranges of Talkgroup values can also be assigned to a specific Logical Media/Control Channel Out (put) and its respective P2P Floor Control process. Other arbitrary mappings of Talkgroup ID's to P2P Floor Control Processes are possible. For example, all Data Structures with Destination Talkgroup ID 1 or Destination Talkgroup ID 3 can be mapped to P2P Floor Control (Logical Channel 2); all Data Structures with Destination Talkgroup ID 1 or Destination Talkgroup ID 2 can be mapped to P2P Floor Control (Logical Channel 1) 265-1.

2. It is possible to have only one Peer's Logical Media/Control Channel Out(put) slaved to WAN operation. In this case, all constructed Data Structures whose components were received from the private, Enterprise LAN or Public Internet would be directed into that one Logical Media/Control Channel's P2P Floor Control process. For example all constructed Data Structures originating from Concatenated packets received on Socket_1 In 200-1 through Socket_N-1 In 200-N-1 could be directed only to P2P Floor Control (Logical Channel 2).

3. The Priority (e.g. emergency) signal that was present in the Internet-P2P Control Signal can direct the Data Structure to be routed to one specific Logical Media/Control Channel's P2P Floor Control Process. In another embodiment, all emergency Data Structures can be directed to all P2P Floor Control Processes.

4. Private Call (also termed Individual Call) can be directed to all P2P Floor Control Processes. A Private Call can be directed to one P2P Floor Control Process 265. A Private Call can be directed to any number of P2P Floor Control Processes 265-1 through 265-m. A Private Call is a "Call Type.

5. The slot number (i.e. the Transport Resource Number which can correspond to a TDM slot on the source Peer) from which the components of the Data Structure originated, can designate to which P2P Floor Control Process the Data Structure should be directed. If the Data Structure is directed to one P2P Floor Control Process, with the P2P Floor Control process mapped to one Logical Media Control/Media Channel Out(put), and the Logical Media Control/Media Channel Out (put) possibly slaved to one Transport Resource out of the base station, all Transport Resources with the same Number into the WAN would be tied to all Transport Resources with the same Number out of the WAN. For example, assume all Data Structures received from base stations on TDM Slot 1 are to be piped into the P2P Floor Control (Logical Channel 1) process 265-1 on all other Peers. If the components of a Data Structure were ultimately sourced from Peer1's TDM Slot Number 1, and was sent as an encrypted, concatenated packet to Peer 4 120-4 and Peer5 120-5, the Data Structure would be eventually directed to Peer4's and Peer5's P2P Floor Control (Logical Channel 1) process 265-1. Since Peer4's and Peer5's P2P Floor Control_1 process 265-1 are slaved to the Logical Media/Control Channel Out(put) 1 205-1 on Peer4 120-4 and Peer5 120-5, the packet can be transmitted out Peer4's and Peer5's TDM Slot Number 1.

6. The Socket from which the components of the Data Structure were received (the components of the Data Structure were within a Concatenated Packet when received on a Socket), can designate to which P2P Floor Control Process 265 the Data Structure should be directed. This would be the same as slaving a P2P Floor Control process 265 to at least one Peer on the WAN. For example, assume Socket_1 200-1 on Peer5 is dedicated to Peer1. Also assume Socket_2 200-2 on Peer5 is dedicated to Peer2. Also assume Socket_N-1 200-N-1 on Peer5 is dedicated to Peer6. The rule can be: if any media is received from Peer1 or Peer2, send it out Peer5's Logical Media/Control Channel_1 Out 205-1; if any media is received from Peer6, send it out Peer5's Logical Media/Control Channel_m Out 205-m. Therefore if the packetized components of a Data Structure were received on Socket_1 200-1 or Socket_2 200-2, the Data Structure should be directed by the Jitter Buffer to Floor Control Router 280 to P2P Floor Control (Logical Channel 1) 265-1; if the packetized components of a Data Structure were received on Socket_N-1 200-N-1, it should be directed to P2P Floor Control (Logical Channel m) 265-m.

Note that the set of rules applied by the Jitter Buffer to Floor Control Router 280 in each Peer 120 need not be the same in each Peer 120 on the WAN 100. For example, the Jitter Buffer to Floor Control Router 280 on Peer1 120-1 may have at least one rule where all Data Structures with Destination Talkgroup ID 1 or Source Mobile Radio ID 2 are directed to P2P Floor Control (Logical Channel 1) 265-1; the Jitter Buffer to Floor Control Router 280 on Peer2 120-2 may have at least one rule where all Data Structures are slaved to P2P Floor Control (Logical Channel 1) 265-1; the Jitter Buffer to Floor Control Router 280 on Peer3 120-3 and Peer4 120-4 may have at least one rule where all Data Structures whose components were received from Peer6 120-6 are directed to P2P Floor Control (Logical Channel 1) 265-1.

Nor are any of the rules above mutually exclusive. For example, the Jitter Buffer to Floor Control Router 280 on Peer5 120-5 may have at least two rules. One rule would be if a Data Structure is received with Destination Talkgroup ID 1 or Source Mobile Radio ID 2 direct the Data Structure to P2P Floor Control (Logical Channel 1) 265-1. The second rule would be if any Data Structure is received from Peer6 120-6 that it be directed to P2P Floor Control (Logical Channel 1) 265-1.

In summary, the Jitter Buffer to Floor Control Router 280 can apply any combination of the rules and the rules need not be the same in each Peer 120.

There is at least one P2P Floor Control process 265 for each Logical Media/Control Channel Out 205 on the Peer 120. The Data Structure that wins the floor is sent typically to the one Logical Media/Control Channel Out 205 to which the P2P Floor Control process 265 is slaved. The goal is to have all P2P Floor Control processes 265 be presented the same information a high percentage of the time and make the same decision—that decision being the determination of which packet of media is to be forwarded to its respective Logical Media/Control Channel Out 205.

Once a stream of Data Structures are fed into the P2P Floor Control process 265, the process has been provided factors upon which enable it to make a "fair" judgment deciding which stream which shall win the floor including the length (size) of the Floor Control Window. In an alternate embodiment, there is local Arrival Time associated with each Data Structure corresponding to when the packetized components of the Data Structure were received on the input Socket 200.

Note the Floor Control Window size in the described embodiment was determined by the Internet Jitter Buffer Length Optimizer. In an alternative embodiment, the Floor Control Window is provisioned by the WAN owner.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operation of a first peer within a distributed peer to peer wide area network, the wide area network comprising a plurality of network locations, each network location consisting of at least one peer and at least one base station, the method comprising:
   identifying, by a first peer in the wide area network, an intermediary peer in the wide area network;
   requesting, by the first peer and from the intermediary peer, an IP address and port number of each other peer in the wide area network;
   receiving at the first peer, in response to the request and from the intermediary peer, the IP address and port number of each of a plurality of other peers in the wide area network;
   assigning, by the first peer, a socket and wide area network jitter buffer for each IP address and port number of each other peer in the wide area network;
   receiving, at the first peer from a mobile radio within coverage of a base station coupled to the first peer, one or more media, with one or more associated control signaling embedded therein, from any one of a plurality of Logical Channels, wherein each Logical Channel is associated with a Transport Resource at the base station;
   extracting the associated control signalling from the one or more media;
   concatenating, by the first peer, the media with the control signaling to form a Concatenated Packet;
   packet duplicating, by the first peer, the Concatenated Packet, thereby forming a plurality of duplicated Concatenated Packets; and
   unicast transmitting, by the first peer, the plurality of duplicated Concatenated Packets, each to a respective other peer via the respective assigned socket and wide area network jitter buffer of the first peer and the wide area network.

2. The method of claim 1, further comprising:
   generating a hash over the Concatenated Packet prior to the packet duplicating step, and concatenating the hash to the Concatenated Packet such that packet duplicating the Concatenated Packet also duplicates the generated hash.

3. The method of claim 2 further comprising prior to the generating the hash step:
   encrypting the Concatenated Packet; and
   generating a Sequence Number of the Concatenated Packet and concatenating the sequence number to the Concatenated Packet.

4. The method of claim 1, wherein the wide area network comprises the Public Internet.

5. The method of claim 1, wherein the media comprises audio media, the method further comprising:
   formatting the audio media within a Real-time Transport Protocol prior to concatenating with the control signaling to form the Concatenated Packet.

6. The method of claim 1, wherein the media comprises data, the method further comprising:
   formatting the data within Peer to Peer Data Packets prior to concatenating with the control signaling to form the Concatenated Packet.

7. The method of claim 1, wherein the received control signaling includes at least one of a Priority, a Destination Talkgroup, a Source Mobile Radio Identification, a Call Type, and a Transport Resource Number.

8. The method of claim 1, wherein the control signaling includes a randomly generated number.

9. The method of claim 8, wherein the randomly generated number remains constant for each of the Concatenated Packets for the length of a single call.

10. The method of claim 8, wherein the randomly generated number remains changes on a time division multiplex slot by slot bases.

11. The method of claim 8, wherein the random number is used in a peer to peer floor control process to resolve packet inter-arrival conflicts.

* * * * *

UNITED STATES PATENT AND TRADEMARK OFFICE
CERTIFICATE OF CORRECTION

PATENT NO. : 8,687,613 B2
APPLICATION NO. : 12/870007
DATED : April 1, 2014
INVENTOR(S) : Robert D. LoGalbo et al.

It is certified that error appears in the above-identified patent and that said Letters Patent is hereby corrected as shown below:

On the Title Page, in Item (56), under "OTHER PUBLICATIONS," in Column 2, Lines 5-6, delete "Terminalogy" and insert -- Terminology --, therefor.

On Page 2, in Item (56), under "OTHER PUBLICATIONS," in Column 1, Line 5, delete "Commonweath" and insert -- Commonwealth --, therefor.

On Page 2, in Item (56), under "OTHER PUBLICATIONS," in Column 1, Line 6, delete "XP002618221," and insert -- XP002518221, --, therefor.

On Page 2, in Item (56), under "OTHER PUBLICATIONS," in Column 1, Line 13, delete "Seivice" and insert -- Service --, therefor.

In the Drawings

In Fig. 7, Sheet 8 of 9, for Tag "730", in Line 1, delete "UNCRYPTED" and insert -- UNENCRYPTED --, therefor.

In the Specification

In Column 4, Line 7, delete "base station 105-1," and insert -- base station 110-1, --, therefor.

In Column 4, Lines 7-8, delete "base station 105-2," and insert -- base station 110-2, --, therefor.

In Column 4, Line 8, delete "base station 105-3," and insert -- base station 110-3, --, therefor.

In Column 4, Line 9, delete "base station 105-4," and insert -- base station 110-4, --, therefor.

In Column 4, Line 10, delete "base station 105-5," and insert -- base station 110-5, --, therefor.

Signed and Sealed this
Fourteenth Day of June, 2016

Michelle K. Lee
*Director of the United States Patent and Trademark Office*

CERTIFICATE OF CORRECTION (continued)
U.S. Pat. No. 8,687,613 B2

In Column 7, Line 33, delete "FRN" and insert -- FRN. --, therefor.

In Column 8, Line 3, delete "x=0.9" and insert -- x=0.9. --, therefor.

In the Claims

In Column 18, Line 29, in Claim 3, delete "2" and insert -- 2, --, therefor.